United States Patent
Chang et al.

(10) Patent No.: US 10,288,758 B2
(45) Date of Patent: May 14, 2019

(54) WIDE BANDWIDTH BOREHOLE DIPOLE SOURCE FOR ACOUSTIC LOGGING

(75) Inventors: Chung Chang, Houston, TX (US); Haoshi Song, Sugar Land, TX (US); Wei Zhang, Houston, TX (US)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 0 days.

(21) Appl. No.: 14/406,502

(22) PCT Filed: Jun. 11, 2012

(86) PCT No.: PCT/US2012/041938
§ 371 (c)(1),
(2), (4) Date: Dec. 8, 2014

(87) PCT Pub. No.: WO2013/187875
PCT Pub. Date: Dec. 19, 2013

(65) Prior Publication Data
US 2015/0143888 A1    May 28, 2015

(51) Int. Cl.
*G01V 1/04* (2006.01)
*G01V 1/40* (2006.01)
(Continued)

(52) U.S. Cl.
CPC .............. *G01V 1/52* (2013.01); *E21B 47/14* (2013.01); *G01V 1/04* (2013.01); *G01V 1/053* (2013.01);
(Continued)

(58) Field of Classification Search
CPC ... G01V 1/04; G01V 1/40; G01V 1/52; G01V 1/147; G01V 1/155; G01V 1/143;
(Continued)

(56) References Cited

U.S. PATENT DOCUMENTS 3,159,233 A * 12/1964 Clynch .................. G01V 1/053
                                                   181/119
3,205,971 A *  9/1965 Clynch .................. G01V 1/053
                                                   181/114
(Continued)

OTHER PUBLICATIONS

Doug Davis, PHY 1150 Chapter 13; Oscillations about Equilibrium, 2005.*
(Continued)

*Primary Examiner* — Daniel S Larkin
*Assistant Examiner* — David L Singer

(57) ABSTRACT

A dipole source for borehole acoustic logging includes a cylindrical shell, a center beam coupled to the cylindrical shell, a movable projector inside the cylindrical shell to impact the center beam, and a cavity acoustically insulating the interior of the cylindrical shell from the exterior of the cylindrical shell. An acoustic logging tool for making measurements of a substrate surrounding a borehole with a body insertable in the borehole is also provided. The body includes an acoustic detector and a dipole source as above, along the axial length. The acoustic logging tool may include a control unit to process data collected from the acoustic detector and obtain information about the substrate surrounding the borehole.

24 Claims, 9 Drawing Sheets

(51) Int. Cl.
  *G01V 1/44* (2006.01)
  *G01V 1/52* (2006.01)
  *E21B 47/14* (2006.01)
  *G01V 1/053* (2006.01)
  *G01V 1/147* (2006.01)
  *G01V 1/155* (2006.01)

(52) U.S. Cl.
  CPC ............. *G01V 1/155* (2013.01); *G01V 1/40* (2013.01); *G01V 1/44* (2013.01); *G01V 1/147* (2013.01); *G01V 2210/121* (2013.01); *G01V 2210/1299* (2013.01); *G01V 2210/1429* (2013.01); *Y10S 181/401* (2013.01)

(58) Field of Classification Search
  CPC ............. G01V 1/53; G01V 221/1216; G01V 221/1299; G01V 221/1429; G01V 1/053; G01V 1/145; G01V 2210/1429; G01V 2210/1216; Y10S 367/912; B06B 1/04; B06B 1/045; B06B 1/10; B06B 1/12; B06B 1/14; G10K 15/04; G10K 15/043; E21B 47/14
  USPC ...... 73/152.58, 152.15, 152.16, 152.47, 570, 73/584, 662, 12.01, 594; 181/102–106, 181/121, 108, 110, 111, 113, 118, 101, 181/112, 114; 367/912, 75, 35, 189; 175/1; 166/249; 310/322
  See application file for complete search history.

(56) References Cited

U.S. PATENT DOCUMENTS

| | | | | |
|---|---|---|---|---|
| 3,641,811 A * | 2/1972 | Gnaedinger, Jr. | ...... | G01N 29/11 73/594 |
| 4,207,961 A * | 6/1980 | Kitsunezaki | ........... | G01V 1/053 181/106 |
| 4,383,591 A * | 5/1983 | Ogura | ................... | G01V 1/143 181/106 |
| 4,639,905 A * | 1/1987 | Goodloe | ................ | G01V 1/053 181/119 |
| 4,648,478 A | 3/1987 | Dedole et al. | | |
| 4,766,974 A * | 8/1988 | Cole | ...................... | G01V 1/047 181/113 |
| 4,923,030 A * | 5/1990 | Meynier | ................ | G01V 1/147 181/106 |
| 4,982,811 A * | 1/1991 | Hardee | .................. | G01V 1/135 181/106 |
| 5,080,189 A * | 1/1992 | Cole | ...................... | G01V 1/145 181/104 |
| 5,416,281 A * | 5/1995 | Ogura | ..................... | G01V 1/52 175/1 |
| 5,534,668 A | 7/1996 | Ogura | | |
| 5,646,379 A * | 7/1997 | Hsu | ........................ | G01V 1/523 166/250.01 |
| 5,831,934 A * | 11/1998 | Gill | .......................... | G01V 1/48 367/25 |
| 5,852,262 A * | 12/1998 | Gill | .......................... | G01V 1/48 181/102 |
| 6,474,439 B1 | 11/2002 | Hoyle et al. | | |
| 6,661,737 B2 * | 12/2003 | Wisniewski | ............. | G01V 1/44 181/103 |
| 6,782,970 B2 | 8/2004 | Chang | | |
| 7,263,029 B2 | 8/2007 | Jackson et al. | | |
| 7,441,628 B2 | 10/2008 | Minto | | |
| 2005/0263340 A1 | 12/2005 | Shehab et al. | | |
| 2011/0019500 A1 | 1/2011 | Plyushchenkov et al. | | |
| 2011/0149687 A1 * | 6/2011 | Rayssiguier | .......... | E21B 47/011 367/82 |

OTHER PUBLICATIONS

John Wiley, Geophysical Prospecting Using Sonics and Ultrasonics, 1999, Wiley Encyclopedia of Electrical and Electronics Engineering.*

International Search Report and The Written Opinion of the International Searching Authority, or the Declaration, dated Sep. 14, 2012, PCT/US2012/041938, 12 pages, International Searching Authority, U.S.

Extended European Search Report, dated Jan. 5, 2016, EP12879005.2, 7 pages.

* cited by examiner

WIDE BANDWIDTH BOREHOLE DIPOLE SOURCE FOR ACOUSTIC LOGGING

The present application is a U.S. National Stage patent application of International Patent Application No. PCT/US2012/041938, filed on Jun. 11, 2012, the benefit of which is claimed and the disclosure of which is incorporated herein by reference in its entirety.

BACKGROUND

1. Technical Field

Embodiments disclosed herein relate generally to the field of borehole acoustic logging and more particularly to the field of dipole sources for acoustic logging in geophysical applications.

2. Description of Related Art

In the field of borehole acoustic logging, dipole sources generate borehole shear waves. Acoustic shear waves provide information related to the composition of a substrate surrounding a borehole. Acoustic dipole sources used currently include piezo-electric (PZ) plate bender bars, piston radiators, and shakers. Bender bars typically emit acoustic waves in a narrow frequency band between 1 kHz to 3 kHz (kilo-Hertz), limiting the measurement range of a logging device. Piston radiators provide a wider bandwidth, but have poor mode purity, typically including monopole, quadrupole and higher order acoustic modes associated with acoustic radiation. In addition, piston radiators lack very low frequency response, which is the soft formation spectral range of shear waves. Some attempts to create acoustic dipole sources have used shaker sources that produce shear waves transferred through the liquid in a borehole. However, shaker sources tend to induce interference of the driving mechanism into the logging tool body, thus requiring a good acoustic isolator to prevent interference. In addition, shaker sources can prove inadequate in providing strong dipole radiation, due to their mass.

In some applications, an explosive force increases the strength of an acoustic wave source. However, explosive forces are difficult to control and may result in multimode contamination of the acoustic signal.

What is needed is a dipole source for acoustic logging applications that has a wide bandwidth of operation and a high modal purity. In addition, what is needed is a dipole source for shear acoustic waves having low frequency and high signal strength.

SUMMARY

According to embodiments disclosed herein, there is provided a dipole source for borehole acoustic logging may include a cylindrical shell, a center beam coupled to the cylindrical shell, and a movable projector disposed inside the cylindrical shell to impact the center beam. The dipole source may further include a cavity acoustically insulating the interior of the cylindrical shell from the exterior of the cylindrical shell.

According to embodiments disclosed herein, there is also provided an acoustic logging tool for making measurements of a substrate surrounding a borehole that may include a body insertable in the borehole and an acoustic detector and a dipole source each disposed along an axial length of the body. In some embodiments the dipole source includes a cylindrical shell, a center beam coupled to the cylindrical shell, a movable projector disposed inside the cylindrical shell to impact the center beam in a direction along a dipole axis of the dipole source, and a cavity acoustically insulating the interior of the cylindrical shell from the exterior of the cylindrical shell. Further, in some embodiments an acoustic logging tool as disclosed herein may include a control unit operatively coupled to the acoustic detector and the dipole source to provide power thereto and to process data collected from the acoustic detector to obtain information about the substrate surrounding the borehole.

According to embodiments disclosed herein, there is also provided a method for generating an acoustic wave in a spatial pattern having a dipole symmetry axis. The method includes providing a current to a coil for a first selected time interval, and propelling a projector to impact a center beam using a magneto-motive force generated by the current during the first selected time interval, the impact of the projector and the center beam comprising a force and a change in time of the force. In some embodiments the method may include providing a restoring force to the projector for a second selected time interval; wherein a direction of the force and a direction of the change in time of the force are substantially the same, along a dipole symmetry axis.

Further according to some embodiments disclosed herein, there is provided a method for measuring properties of a substrate using an acoustic logging tool having a dipole source. The method may include generating an acoustic wave in a pattern substantially symmetric about an axis of the dipole source, detecting the acoustic wave using an acoustic detector placed along an axial length of the acoustic logging tool, and measuring a velocity of the acoustic wave through the substrate.

BRIEF DESCRIPTION OF THE DRAWINGS

Wherever possible, like reference numbers refer to the same or like elements throughout the drawings.

DETAILED DESCRIPTION

Figure 1:
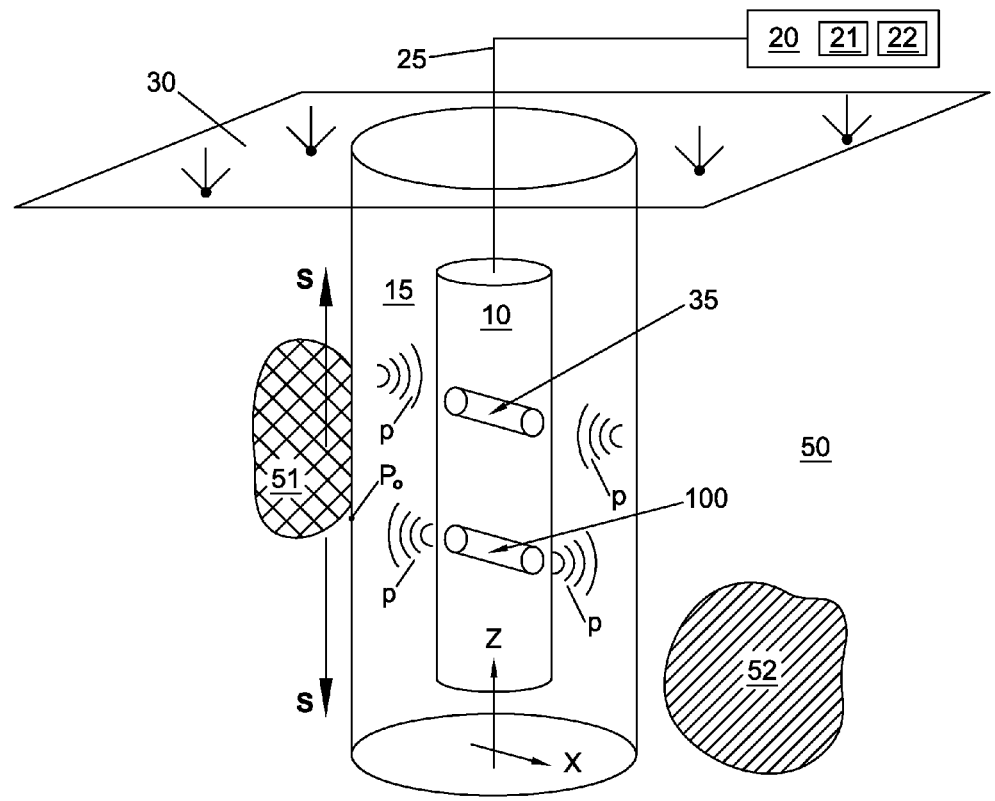
FIG. 1 illustrates an acoustic logging tool including a dipole source inside a borehole, according to some embodiments.

In the field of oil extraction and prospection, acoustical logging tools provide information as to the hydrocarbon content of earth formations at locations of interest. In order to obtain accurate information it is desirable to have acoustic sources that provide good modal purity and a strong signal. According to embodiments disclosed herein, a wide bandwidth, borehole dipole source uses a strong impact mechanism inside a cylindrical shell. Thus, a dipole source as disclosed herein may generate a strong dipole signal, in some cases including a low frequency. Such acoustic dipole signal results in accurate shear speed measurements. The use of an impact mechanism such as the one disclosed herein may also provide a wide bandwidth of acoustic waves due to the frequency content of the impact pulse shape. Further, some embodiments of the present disclosure use materials in the dipole source that optimize the strength and bandwidth of the generated dipole acoustic waves. This in turn generates a higher signal-to-noise ratio (SNR) in the measurements obtained by the acoustic logging tool.

A measure of the acoustic wave strength is the pressure output of the wave at a given distance from the source of the wave. In some embodiments a strong acoustic wave at about 500 Hertz (Hz) may produce a pressure output of about 80 Pa at about one meter (1 m) distance from the source. In some embodiments, a strong acoustic wave at about 5 kHz (kilo-Hz) may produce a pressure output of about 1000 Pa, at a bout 1 m distance from the source. Some embodiments may include a good modal purity such that the ratio of measured strength of a dipole component of the acoustic wave to the measured strength of a quadrupole component of the acoustic wave is greater than 20 decibels (dB). Thus, some embodiments provide an acoustic source that provides an acoustic wave with a strength that is about 99% in a dipole component and about 1% or less in a quadrupole or higher order component. The modal purity of an acoustic wave may depend on the frequency of the acoustic wave. According to some embodiments of dipole sources, a modal purity of the acoustic waves generated by the source may be about 20 dB or greater for a frequency range between 0.3 kHz and 9 kHz.

Wireline logging applications may use acoustic dipole sources consistent with the present disclosure. Wireline logging performs acoustic logging in a previously drilled borehole. Logging-while-drilling (LWD) applications may also use an acoustic dipole source according to embodiments consistent with the present disclosure. An LWD configuration logs acoustic data while drilling a borehole.

An acoustic perturbation may be produced by a pressure wave p(R,t) propagating through a medium such as a fluid, a solid, or a colloid. The behavior with time, t, of pressure perturbation, $p(\vec{R},t)$, located at a point $\vec{R}$ relative to a point dipole source driven by an impulsive force $\vec{F}(t)$, is given by $$p(\vec{R},t) = \frac{1}{4\pi}\hat{e}_R \cdot \left(\frac{1}{|\vec{R}|} + \frac{1}{c}\frac{\partial}{\partial t}\right)\frac{\vec{F}(t-|\vec{R}|/c)}{|\vec{R}|} \quad (1)$$

where $\hat{e}_R$ is a unit vector oriented along the direction of receiving position $\vec{R}$, and c is the speed of sound in the medium. The vector product in Eq. (1) is a 'dot' product, leading to a scalar quantity, $p(\vec{R},t)$. The dipole source may be located in the origin of the coordinate system in Eq. (1). According to some embodiments consistent with the present disclosure, the force $\vec{F}$ and its time derivative are aligned in the same direction. The direction of alignment of the force $\vec{F}$ and its time derivative forms the axis of the dipole source, or dipole axis. In such configuration, the spatial pattern of an acoustic perturbation as described in Eq. (1) is substantially symmetric about the dipole axis. That is, the value of the perturbation $p(\vec{R},t)$ is substantially the same for all points in a circle centered on the dipole axis, the circle being in a plane perpendicular to the dipole axis.

From Eq. (1), an increase in the amplitude of the acoustic perturbation may be obtained by increasing the magnitude of the driving force $\vec{F}$, by increasing the time derivative of the driving force $\vec{F}$, or a combination of both. According to embodiments disclosed herein, an impact force enhances both the magnitude and the time derivative of driving force $\vec{F}$.

Use of an impact force $\vec{F}(\vec{R},t)$ having a sharp temporal profile increases the magnitude and the time derivative of driving force $\vec{F}$ and, thus, the amplitude of the dipole perturbation $p(\vec{R},t)$ (cf. Eq. (1)). Thus, an acoustic source according to embodiments disclosed herein provides a wide bandwidth dipole acoustic perturbation.

Also from Eq. (1) it is seen that the acoustic perturbation 'p' is greater in a direction $\vec{R}$ aligned with driving force $\vec{F}$ and its time derivative. The acoustic perturbation, p, has a positive value in a parallel orientation to driving force $\vec{F}$ and its time derivative, and an equal but negative value in the opposite "anti-parallel" direction. Aligning the driving force $\vec{F}$ and its time derivative in the same direction enhances the magnitude of the acoustic perturbation, p. Thus, a pressure wave having a maximum positive value in a given direction and a minimum negative value in the opposite direction may be a pure dipole emitter as described by Eq. (1). Note that, in general, an acoustic wave may have multiple components. Some of these components may not be of a pure dipole nature as described in Eq. (1) above. For example, a pressure wave radiating from a point outward symmetrically in all directions may be associated to a monopole radiation source. Other types of multi-pole radiation are feasible, such as a combination of two anti-parallel dipole emitters placed close to one another, and one with a single dipole alternating sign. Such combinations may produce a quadrupole wave. A quadrupole wave may have two perturbation maxima alternating with two perturbation minima along a circumference surrounding an axis of symmetry including the source point.

According to embodiments disclosed herein, an acoustic dipole source uses electrical coils, permanent magnets, and magnetically susceptible materials to deliver a strong impact force consistent with Eq. (1). Thus, embodiments disclosed herein implement a dipole acoustic source having a wide frequency band. In embodiments consistent with the present disclosure, use of a dipole source enables an efficient generation of shear waves in a substrate. FIG. 1 illustrates in detail the use of a dipole source to generate shear waves in a substrate.

FIG. 1 illustrates an acoustic logging tool 10 including a dipole source 100 inside a borehole 15, according to some embodiments. Some applications insert acoustic logging tool 10 inside borehole 15, having a longitudinal axis, Z, as illustrated in FIG. 1. A controller 20 provides power and data exchange channels with logging tool 10, through a connector 25. Controller 20 may include a processor circuit 21 and a memory circuit 22 for processing data and control commands. Connector 25 may include digital and analog data lines, electrical wiring, and mechanical couplings between logging tool 10 and controller 20. According to some embodiments, controller 20 is located on a surface 30, outside of borehole 15. In some embodiments, controller 20 or a portion of it may be included inside logging tool 10. Dimensions of elements and components in FIG. 1 may vary according to the specific application and should not be limiting of the embodiments disclosed herein. The specific diameter of the logging tool 10 is not limiting and may vary depending on the conditions and tools used for creating the borehole 15. In some embodiments, the logging tool 10 may have a diameter of a few inches, for example less than about 4 inches. In some embodiments, the logging tool 10 may have a diameter of about 3 inches, or less.

FIG. 1 illustrates a Z-axis in the vertical direction and an X-axis in a horizontal plane. This configuration is not limiting and one of ordinary skill will recognize that some applications drill borehole 15 in a substrate 50 in any orientation relative to the vertical. Thus, Z-axis may be a longitudinal direction along borehole 15, oriented in any direction relative to a vertical direction. Likewise, the X-axis is orthogonal to the Z-axis, in a cross-sectional plane perpendicular to the longitudinal direction.

In order to provide a wide band of acoustic frequencies, the design and materials chosen for logging tool 10 and dipole source 100 are such that the resonance frequency of dipole source 100 and the logging tool 10 is outside of the desired acoustic bandwidth range. Thus, logging tool 10 or dipole source 100 absorb and scatter little or no acoustic energy generated by dipole source 100. Instead, it is desirable to transmit most of the generated acoustic energy directly to fluids surrounding logging tool 10 in borehole 15.

Consistent with some embodiments, borehole 15 is drilled through substrate 50 prior to introducing logging tool 10 inside borehole 15. Consistent with such embodiments, once borehole 15 has been drilled logging tool 10 is slowly displaced along an axis Z of borehole 15, to create an acoustic log of substrate 50. This may be the case for a wireline application of tool 10, as disclosed herein. For example, some applications may place logging tool 10 at the bottom of borehole 15 and slowly move it up, while collecting data. Some embodiments may collect data while displacing logging tool 10 down into borehole 15, along the Z-axis. Some embodiments drill borehole 15 at the same time as displacing tool 10 along the Z-axis to provide acoustic logging of substrate 50. This is the case of LWD or measure-while-drilling (MWD) applications of logging tool 10, as disclosed herein. Substrate 50 may include earth formations such as sand gap 51 and porous rock 52. According to some embodiments, borehole 15 may include a material such as a fluid, a colloid, or mud between tool 10 and the inner walls of borehole 15.

According to some embodiments, dipole source 100 may be oriented in a direction perpendicular to an axis of borehole 15. For example, as shown in FIG. 1, dipole source 100 is oriented along in a direction X (i.e. the "X-axis"), perpendicular to the borehole axis Z, i.e. the "Z-axis". Further consistent with some embodiments, the acoustic wave pattern generated by dipole source 100 may be symmetric with respect to orientation direction, which is the X-axis in FIG. 1. Note that the choice of X-Z axes as in FIG. 1 is arbitrary and bears no limitation on the general concept illustrated in FIG. 1. The acoustic perturbation, p, produced by dipole source 100 travels in a plane perpendicular to the Z-axis through the material (mud) in borehole 15 impinging substrate 50, at a point $P_o$. The acoustic perturbation, p, is then transformed in substrate 50 into a shear/flexural wave S that travels axially back and forth along the Z-axis, parallel to borehole 15. Wave S has a frequency spectrum influenced by the frequency spectrum of acoustic perturbation p. Wave S has a given propagation speed, $v_s$, at a low frequency and is dispersive at high frequencies. The dispersion properties of wave S include the propagation speed of wave S as a function of its frequency. An acoustic detector 35 in logging tool 10 may detect wave S at a known separation along the Z-axis from dipole source 100. The nature of the earth formations traversed by wave S, such as sand gap 51 or porous rock 52, may influence the speed $v_s$. Consequently, by measuring the time of travel of wave S through substrate 50, a measure of speed $v_s$ may be determined using the known separation between source 100 and detector 35. As a result, this measurement of speed $v_s$ provides information about earth formations encountered by wave S in its travel, such as sand gap 51 or porous rock 52.

FIG. 1 shows acoustic detector 35 above dipole source 100. One of ordinary skill will recognize that the relative location of acoustic detector 35 and dipole source 100 is not limiting. In some embodiments, an acoustic detector 35 may be located below dipole source 100. Further, some embodiments may include a plurality of acoustic detectors 35 located above, below, or both above and below dipole source 100, with knowledge of the distances between dipole source 100 and acoustic detectors 35.

Dipole source 100 may be a "pure" dipole source. A "pure dipole source" produces a pressure perturbation having a spatial pattern given by Eq. (1) above. Use of a pure dipole source in tool 10 is desirable due to the directionality discussed in relation to Eq. (1), above. A pure dipole source more efficiently transmits the acoustic perturbation energy in the direction of the X-axis into the mud of borehole 15 and substrate 50. When acting as a pure dipole, source 100 provides a maximum perturbation, p, at point $P_o$ in substrate 50 closest to source 10, along the dipole axis (cf. FIG. 1). Once the acoustic perturbation interacts with the substrate at point $P_o$ it becomes shear/flexural wave S, traveling through substrate 50. The dispersion properties of wave S can provide information as to the nature of formations in the substrate 50, such as sand gap 51 and porous rock 52.

Figure 2:
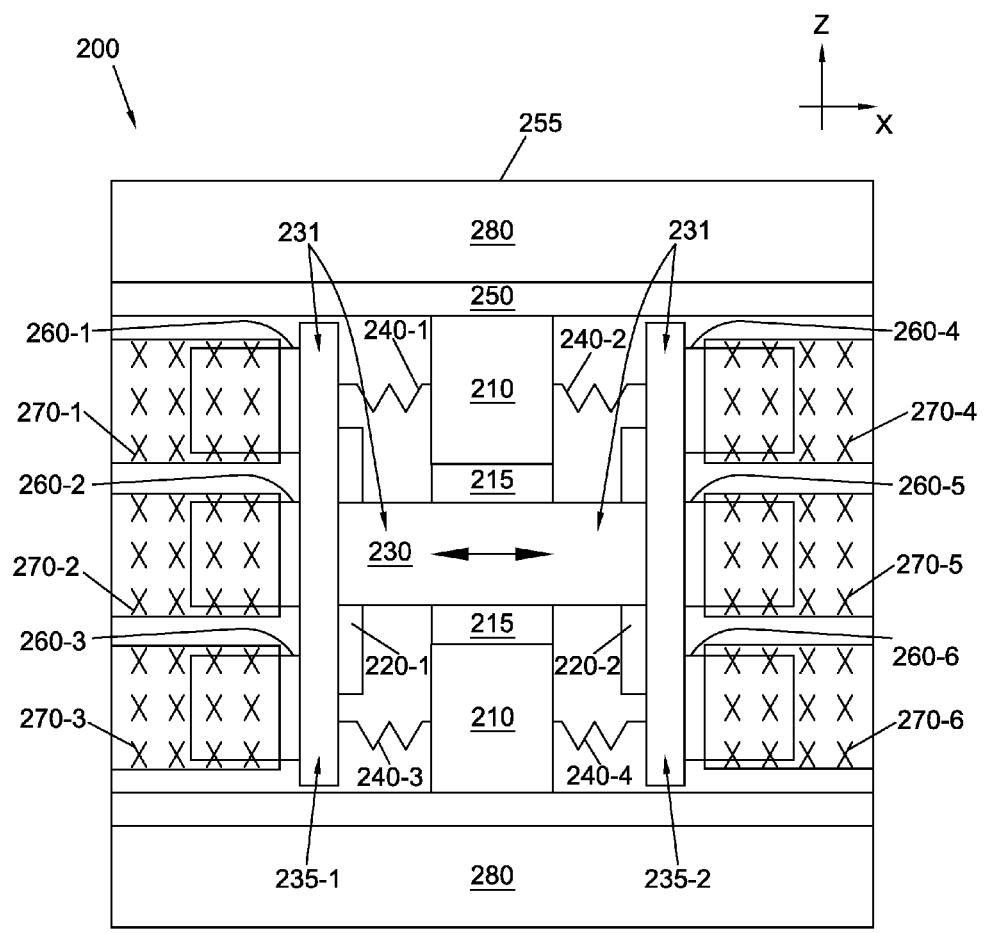
FIG. 2 is a cross-sectional view of a wide bandwidth, borehole dipole source, according to some embodiments.

FIG. 2 is a cross-sectional view of a wide bandwidth, borehole dipole source 200, according to some embodiments. Logging tool 10 may use dipole source 200 as source 100, consistent with embodiments disclosed herein (cf. FIG. 1). FIG. 2 depicts X-Z directions as being oriented in a horizontal-vertical configuration, as in FIG. 1. However, the selection of X-Z coordinates as in FIG. 2 is arbitrary and not limiting of the general concept illustrated in the figure. Dipole source 200 includes a cylindrical shell 255. According to embodiments consistent with the present disclosure, cylindrical shell 255 has an axis oriented along the Z-axis.

Dipole source 200 may include a center beam 210 having a bushing 215 to allow shaft 230 to move back and forth along an axis of shaft 230, which is the X-axis in FIG. 2. In some embodiments, frame 250 couples center beam 210 to cylindrical shell 255 mechanically. Shaft 230 can have a cylindrical shape and an axis that is perpendicular to the axis of cylindrical shell 255, according to some embodiments. According to some embodiments, a projector 231 is contained inside cylindrical shell 255. In some embodiments, projector 231 may be a moveable projector configured to move along a direction of motion. Projector 231 includes shaft 230, a first portion 235-1, a second portion 235-2, stoppers 220-1, 220-2 and springs 240-1 through 240-4. Stoppers 220-1 and 220-2 provide a point of contact between first portion 235-1 and second portion 235-2 with either side of center beam 210, respectively. Springs 240-1 through 240-4 couple projector 231 to center beam 210. Springs 240-1 through 240-4 center the travel of projector 231 back and forth along the X-axis. Springs 240-1 through 240-4 also provide a restoring force to projector 231.

According to some embodiments, projector 231 may also include two or more magnets 260-$j$ (six are shown 260-1 through 260-6) and two or more coils 270-$j$ (six are shown 270-1 through 270-6). Some embodiments include placing magnets 260-1 through 260-6 symmetrically distributed on projector 231 about center beam 210. Further, some embodiments include placing magnets 260 symmetrically about the axis of shaft 230 (X-axis), although only partially shown in FIG. 2. For example, embodiments consistent with the present disclosure include magnets 260-1 through 260-3 attached to first portion 235-1 of projector 231, and magnets 260-4 through 260-6 to second portion 235-2 of projector 231. Each of the conductive coils 270-1 through 270-6 surrounds one of the magnets 260-1 through 260-6. Some embodiments include attaching conductive coils 270-1 through 270-6 to cylindrical shell 255, as illustrated in FIG. 2. Each of conductive coils 270-$j$ may be electrically coupled to a power source outside of dipole source 200 to receive a current, I 270-$j$.

Embodiments of a dipole source as disclosed herein provide a magneto-motive force to projector 231 along the X-axis. The interaction of each of magnets 260-1 through 260-6 and a temporary magnetic field established through each of coils 270-1 through 270-6 produces the magneto-motive force. Each pair of magnet 260-$j$ and coil 270-$j$ contributes with a force $F_x$-j on projector 231. The net force on projector 231 is the sum of all forces $F_x$-1 through $F_x$-6, according to embodiments disclosed herein. For example, when current I 270-$j$ is transmitted through coil 270-$j$, a magnetic field M 270-$j$ is generated along the X-axis, centered on coil 270-$j$. Magnetic field M 270-$j$ interacts with magnetic field M 260-$j$ of magnet 260-$j$. The interaction between M 270-$j$ and M 260-$j$ may be attractive, if field M 270-$j$ and M 260-$j$ are anti-parallel; or repulsive, if field M 270-$j$ and M 260-$j$ are parallel. While the orientation of magnetic field M 260-$j$ is fixed by permanent magnet 260-$j$, the orientation of field M 270-$j$ depends on the direction of current I 270-$j$, relative to the X-axis (clockwise or counter-clockwise). The direction of current I 270-$j$ relative to the X-axis is determined by the sign of current I 270-$j$ and by the orientation of the windings in coil 270-$j$. Thus, for a given configuration of magnet 260-$j$ and coil 270-$j$, the magneto-motive force $F_x$-j on projector 231 may be reversed by reversing the direction of current I 270-$j$.

The magneto-motive force $F_x$ on projector 231 produces an accelerated motion of projector 231 in either direction along the X-axis. Eventually, projector 231 impacts center beam 210 through stoppers 220-1 and 220-2. Thus, when projector 231 moves in the +X direction (due to a positive $F_x$), stopper 220-1 impacts a left face of center beam 210 (cf. FIG. 2). Likewise, when projector 231 moves in the −X direction (due to a negative $F_x$), stopper 220-2 impacts a right face of center beam 210 (cf. FIG. 2). Frame 250 transfers the impact force of projector 231 on center beam 210 to cylindrical shell 255. A conversion of the force of projector 231 on center beam 210 to acoustic energy occurs through the elastic properties of the material in center beam 210. Furthermore, the acoustic energy thus produced contains a wide frequency bandwidth because of the rise time and fall time of the impact force by projector 231.

Note that, according to embodiments consistent with the present disclosure, frame 250 transfers acoustic energy to cylindrical shell 255 along the X-direction. For example, most of the acoustic energy produced by the impact of projector 231 on center beam 210 can be transferred to the edges of cylindrical shell 255, located in the left (−X) and right (+X) faces (cf. FIG. 2). Moreover, due to the rigidity of frame 250 and the directionality of the impact produced by projector 231, some embodiments may produce a positive pressure wave on one side of cylindrical shell 255 (say, the +X face of shell 255). At the same time, some embodiments produce a negative pressure wave on the opposite side of cylindrical shell 255 (the −X face of shell 255). This may be the case when a positive force +$F_x$ moves projector 231 in the +X direction. When a negative force −$F_x$ moves projector 231 in the −X direction, a positive pressure wave is produced on the −X face of shell 255 and a negative pressure wave is produced on the +X face of shell 255. According to embodiments consistent with the present disclosure, the impulsive force produced by projector 231 has a time derivative in a direction substantially parallel to the force itself (in the X-direction). Thus, the impulse force of projector 231 on center beam 210 may act as a "pure dipole source" and produce a pressure perturbation having a spatial pattern given by Eq. (1) above. Such a pure dipole source provides advantages such as having low contamination from other modes, such as a monopole, a quadrupole, or higher order modes.

The detailed temporal profile of an impact force $iF_x(t)$ exerted by projector 231 on center beam 210 is determined in part by stoppers 220-1 and 220-2. The elastic properties of the material selected for stoppers 220-1 and 220-2 may result in force $iF_x(t)$ having different temporal profiles. For example, a soft, resilient material in stoppers 220-1 and 220-2 may result in a longer contact period having a slower rising time. Some embodiments use soft materials such as rubber or plastic for stoppers 220-1 and 220-2 consistent with the present disclosure. A hard material in stoppers 220 may result in a narrow profile having a faster rise time and a shorter contact period. Some examples of hard materials used in stoppers 220 consistent with the present disclosure include copper and stainless steel. Balance springs 240-1 through 240-4 maintain the motion of projector 231 along the X-axis. Springs 240-1 through 240-4 also provide a restoring force rFx to projector 231 back to its original position after impact with center beam 210.

To generate a dipole mode having low higher order contamination it is desirable that projector 231 strike a well-supported and balanced center beam 210. Vibrations or displacements of projector 231 outside of the X-axis direction may alter the direction of force $\vec{F}$ and its time derivative, reducing the dipole strength (cf. Eq. (1)). It is also desirable to transmit the impact force efficiently to cylindrical shell 255. The space inside cylindrical shell 255 is limited, thus a large driving force $F_x$ may accelerate projector 231 to a desirable speed in order to provide a strong impact. For example, in some embodiments a speed of about 10 m/s or up to about 20 m/s may be reached within a cylindrical shell 255 having about 4 inches (~0.10 m) in length (along the X-direction). In some embodiments consistent with the present disclosure the total mass of projector 231 may be increased to produce a stronger impact force $iF_x(t)$. Consistent with some embodiments, the plurality of magnetic coils 270 is used to drive the plurality of magnets 260 in push and pull modes to enhance the driving force $F_x$. In some embodiments the elements shown inside cylindrical shell 255 in FIG. 2, including projector 231, are not in direct contact with borehole mud. Preventing direct contact of mechanical elements with borehole mud enhances the conversion efficiency of acoustic perturbation p into a shear wave S, as described above.

Dipole source 200 may also include cavity 280 surrounding frame 250, providing sound isolation between center beam 210 and cylindrical shell 255. For example, air or any other fluid having a large impedance mismatch with the material of shell 255 may fill cavity 280. Thus, cavity 280 may form an 'air cushion' surrounding center beam 210 and frame 255. Shell 255 may be made of a material having a high Young modulus, such as metal. Thus, sound produced by the impact of projector 231, i.e. the "impact sound," on center beam 210 may propagate through the fluid in cavity 280, but be decoupled from shell 255. Embodiments disclosed herein prevent impact sound occurring inside shell 255 from interfering with the detection of shear acoustic wave S propagating through substrate 50 (cf. FIG. 1).

Figure 3A:
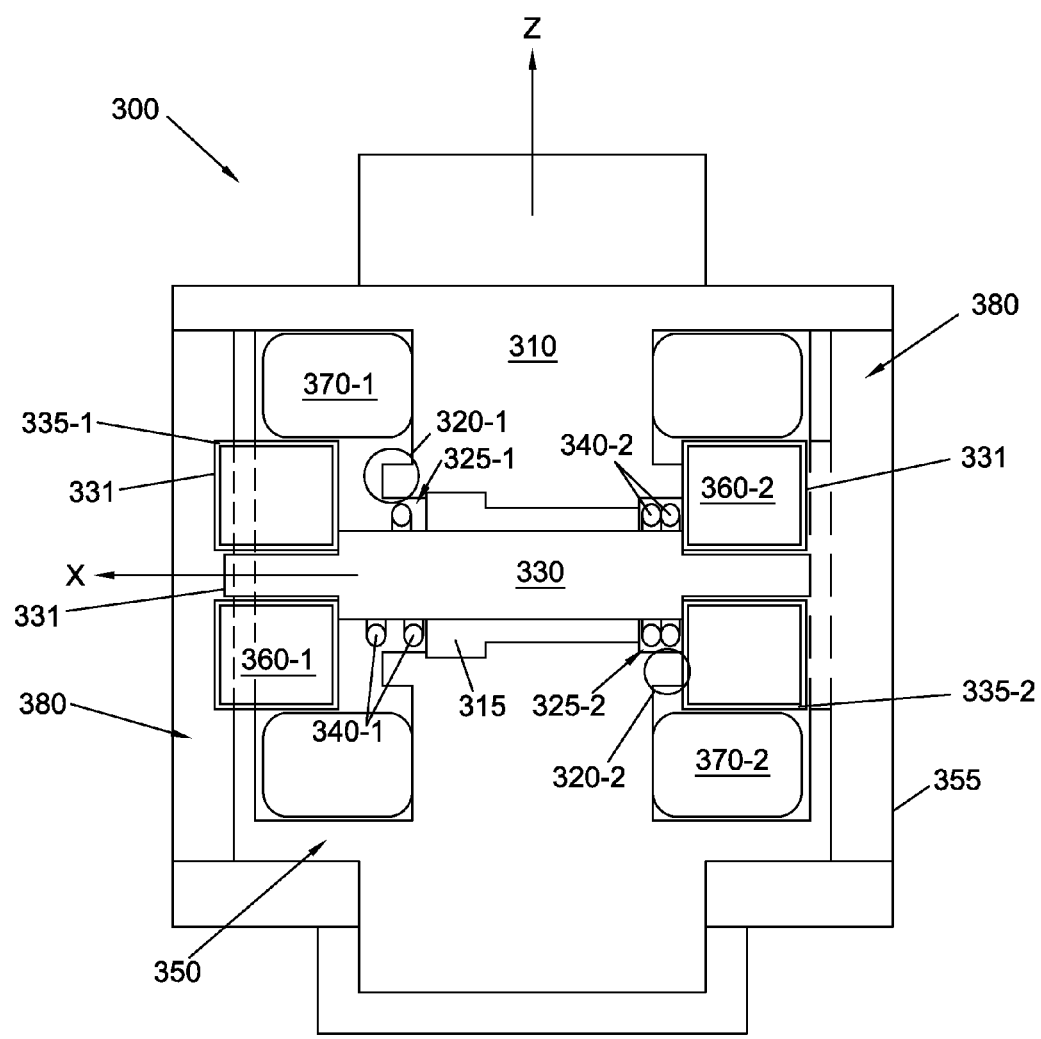
FIG. 3A illustrates a cross-sectional view of a wide bandwidth, borehole dipole source, according to some embodiments.

FIG. 3A illustrates a wide bandwidth, borehole dipole source 300, according to some embodiments. The operation and components in dipole source 300 may be similar to the operation and components of source 200 (cf. FIG. 2). Dipole source 300 may include a center beam 310 having a bushing 315 to allow shaft 330 to move back and forth along an axis of shaft 330, shown in FIG. 3A as the X-axis. Frame 350 couples center beam 310 to a cylindrical shell 355. Shaft 330 has a cylindrical shape and has an axis along the X-axis. According to some embodiments, a projector 331 is contained inside cylindrical shell 355. Projector 331 has subparts including shaft 330, a first portion 335-1, and a second portion 335-2. Stoppers 320-1 and 320-2 provide a point of contact between first portion 335-1 and second portion 335-2 with either side of center beam 310, respectively. Springs 340-1 and 340-2 provide a restoring force to projector 331.

According to some embodiments, projector 331 may also include two or more magnets (FIG. 3A illustrates two: 360-1 and 360-2). Some embodiments include distributing magnets 360-1 and 360-2 symmetrically around projector 331, about center beam 310, and about the X-axis. For example, according to some embodiments consistent with the present disclosure magnet 360-1 may be contained within first portion 335-1 of projector 331, and magnet 360-2 may be contained within second portion 335-2 of projector 331. Conductive coils 370-1 and 370-2 may surround magnets 360-1 and 360-2, respectively. Some embodiments include attaching conductive coils 370-1 and 370-2 to center beam 310, as illustrated in FIG. 3A. Some embodiments include connecting each of conductive coils 370-1 and 370-2 to a power source or a current source outside of dipole source 300 to receive a current, I 370-1, and I 370-2, respectively.

Embodiments of a dipole source as disclosed herein provide a magneto-motive force to projector 331 along the X-axis. The interaction of magnets 360-1 and 360-2, and a temporary magnetic field established through coils 370-1 and 370-2 produces the magneto-motive force. Each pair of magnets 360-1, 2 and coils 370-1, 2 contributes with a force $F_x$-1, 2 on projector 331. The net force on projector 331 is the sum of forces $F_x$-1 and $F_x$-2. For example, when current I 370-1 is provided through coil 370-1, a magnetic field M 370-1 is generated along the X-axis, at the center of coil 370-1. Magnetic field M 370-1 interacts with magnetic field M 360-1 of magnet 360-1. The interaction between M 370-1 and M 360-1 may be attractive, if M 370-1 and M 360-1 are anti-parallel; or repulsive, if M 370-1 and M 360-1 are parallel. While the orientation of magnetic field M 360-1 is fixed by permanent magnet 360-1, the orientation of field M 370-1 depends on the direction of current I 370-1, relative to the X-axis (clockwise or counter-clockwise). The direction of current I 370-1 relative to the X-axis is determined by the sign of current I 370-1 and by the orientation of the windings in coil 370-1. Thus, for a given configuration of magnet 360-1 and coil 370-1, the magneto-motive force $F_x$-1 on projector 331 may be reversed by reversing the direction of current I 370-1. Likewise, magneto-motive force $F_x$-2 may be applied on projector 331 and reversed using current I 370-2.

The magneto-motive force $F_x$ on projector 331 produces an accelerated motion of projector 331 in either direction along the X-axis. Eventually, projector 331 impacts center beam 310 through stoppers 320. Thus, when projector 331 moves in the +X direction (positive $F_x$), second portion 335-2 impacts stopper 320-2 on the right face of center beam 310. Likewise, when projector 331 moves in the −X direction (negative $F_x$), first portion 335-1 impacts stopper 320-1 on the left face of center beam 310. Frame 350 transfers the impact force of projector 331 on center beam 310 to cylindrical shell 355. The elastic properties of the material in center beam 310 convert the force of projector 331 on center beam 310 to acoustic energy. Furthermore, the acoustic energy thus produced contains a wide frequency bandwidth because of the fast rise time and fall time of the impact force by projector 331.

Springs 340-1 and 340-2 provide a restoring force rFx to projector 331. In some embodiments springs 340-1 and 340-2 may be coiled around shaft 330 and such that stoppers 320-1, 320-2 and shaft 330 form cavities 325-1 and 325-2 to compress springs 340-1 and 340-2, respectively. As projector 331 moves in the −X direction (to the right in FIG. 3A), spring 340-1 is compressed inside cavity 325-1. In some embodiments, the depth of cavity 325-1 is greater than the minimum length of spring 340-1. Thus, compression of spring 340-1 inside cavity 325-1 does not damage spring 340-1. Once magneto-motive force on projector 331 is turned off, spring 340-1 provides restoring force rFx on projector 331 to move it back to its equilibrium position, in the +X direction. Spring 340-2 performs a similar action a magneto-motive force moves projector 331 in the +X direction. In this case, spring 340-2 provides restoring force rFx on projector 331, in the −X direction.

Dipole source 300 may also include cavity 380 surrounding frame 350, to provide sound isolation between center beam 310 and cylindrical shell 355. In some embodiments, air fills cavity 380 forming an air cushion around center beam 310 and frame 350. Sound is then prevented from interfering with the detection of shear acoustic wave S propagating through substrate 50 (cf. FIG. 1), in a similar manner as described in detail in relation to cavity 280 in dipole source 200 (cf. FIG. 2).

Note that, according to some embodiments consistent with the present disclosure, frame 350 transfers acoustic energy to cylindrical shell 355 preferentially along the X-direction. Thus, most of the acoustic energy produced by the impact of projector 331 on center beam 310 will be transferred to cylindrical shell 355, in the left (−X) and right (+X) directions. Moreover, due to the rigidity of frame 350 and the directionality of the impact produced by projector 331, some embodiments may produce a positive pressure wave on one side of cylindrical shell 355 (e.g., the +X side of shell 355). At the same time, some embodiments produce a negative pressure wave on the opposite side of cylindrical shell 355 (the −X side of shell 355). This may be the case when a positive force $+F_x$ moves projector 331 in the +X direction. When a negative force $-F_x$ moves projector 331 in the −X direction, a positive pressure wave is produced on the −X side of shell 355 and a negative pressure wave is produced on the +X side of shell 355. According to embodiments consistent with the present disclosure, the impulsive force produced by projector 331 has a time derivative oriented in a direction substantially parallel to the force itself (in the ±X-direction). Thus, the impulse force of projector 331 on center beam 310 may act as a "pure dipole source" and produce a pressure perturbation having a spatial pattern given by Eq. (1) above. Such a pure dipole source provides advantages such as having a low contamination from other acoustic modes, including as a monopole, a quadrupole, or higher order modes.

Figure 3B:
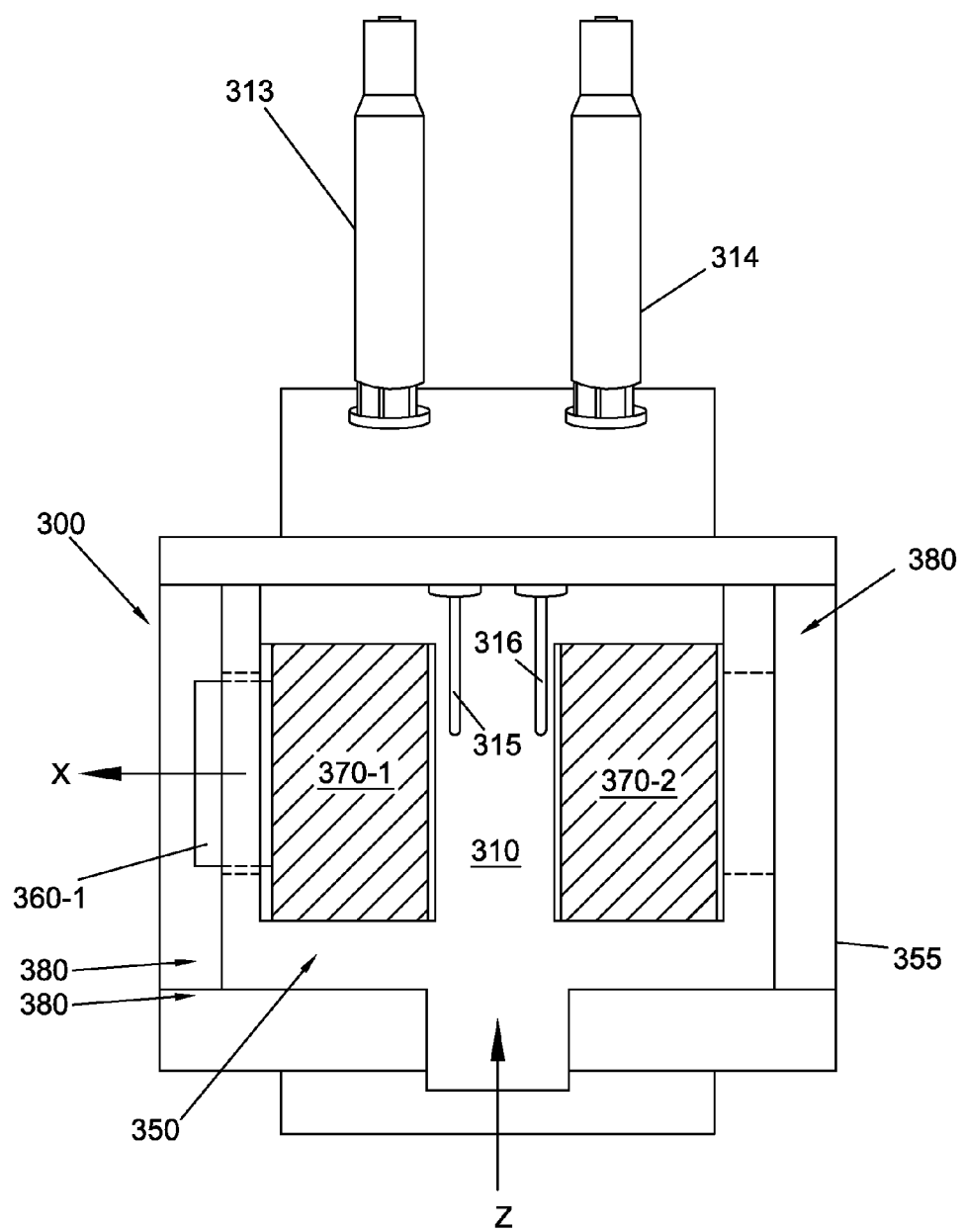
FIG. 3B illustrates a cross-sectional view of a wide bandwidth, borehole dipole source, according to some embodiments.

FIG. 3B illustrates wide bandwidth borehole dipole source 300, according to some embodiments. FIG. 3B is a different view of wide bandwidth borehole dipole source 300 as shown in FIG. 3A. Dipole source 300 may include a first current feed-through 313 to provide current I 370-1 to coil 370-1 and a second current feed-through 314 to provide current I 370-2 to coil 370-2. According to embodiments consistent with the present disclosure, dipole source 300 may include connector 315 coupling feed-through 313 with coil 370-1. Also included is connector 316 coupling feed-through 314 with coil 370-2. Center beam 310, cylindrical shell 355, magnet 360-1, and coils 370-1, 2 are as described above in relation to FIG. 3A.

Figure 4:
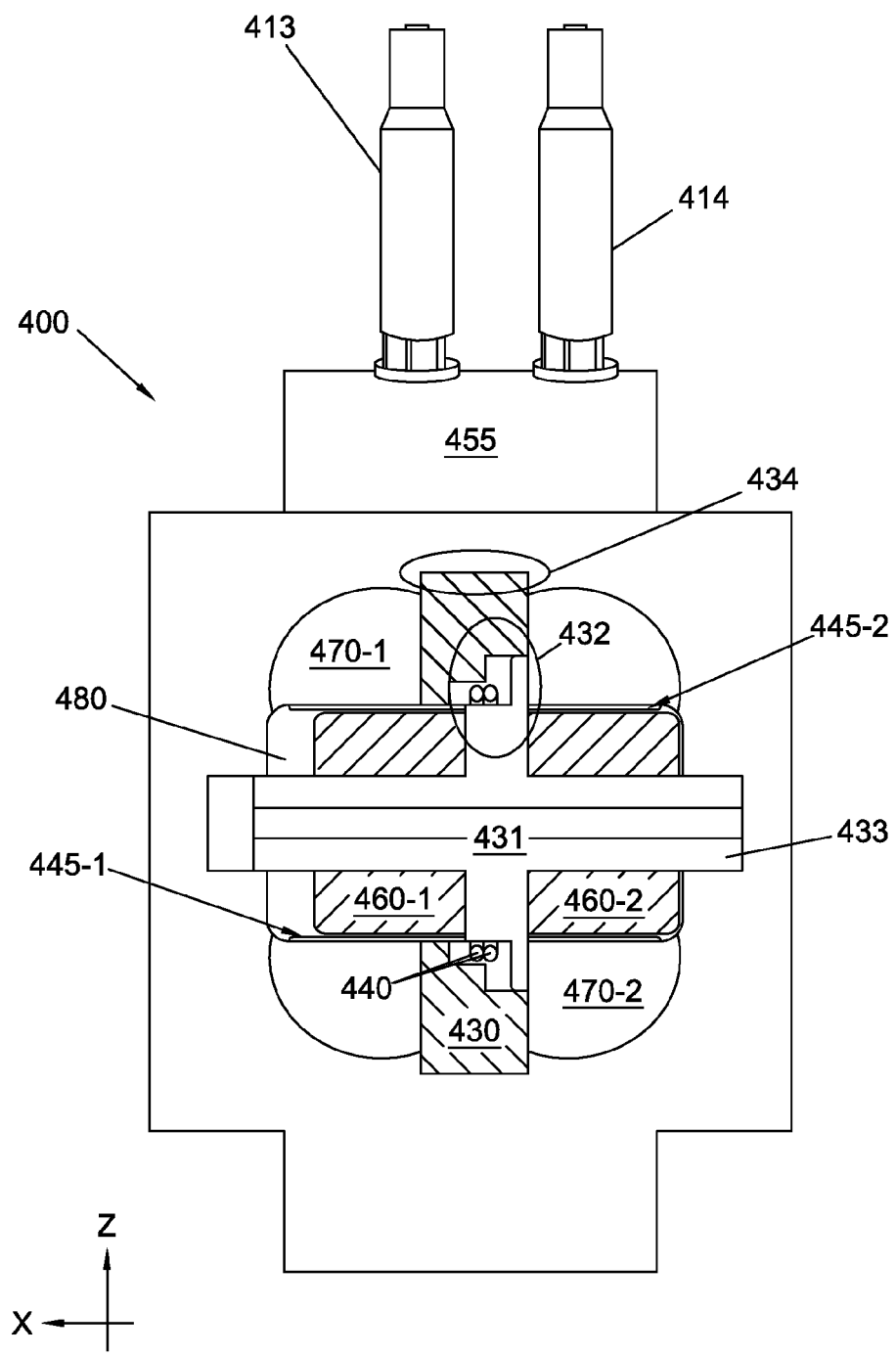
FIG. 4 illustrates a cross-sectional view of a wide bandwidth, borehole dipole source, according to some embodiments.

FIG. 4 illustrates a cross-sectional view of a wide bandwidth, borehole dipole source 400 according to some embodiments. Dipole source 400 may include current feed-through 413 and current feed-through 414, as described in detail above with respect to elements 313 and 314 in FIG. 3B. According to embodiments consistent with the present disclosure, dipole source 400 includes coils 470-1 and 470-2, each coupled to either feed-through 413, or feed-through 414. Contact portion 432 separates a ring stopper 430 from a cylindrical shell 455, and fixes ring stopper 430 to a shell 455. Ring stopper 430 has a circularly symmetric shape about the axis of motion of projector 431, i.e. the X-axis. Consistent with some embodiments, using ring stopper 430 separated from cylindrical shell 455 reduces low resonance bending modes of the structure forming dipole source 400. This may be desirable for generation of low frequency acoustic waves decoupled from dipole source 400. Projector 431 includes magnets 460-1 and 460-2. Projector 431 also has an extrusion 432 in the middle portion of a shaft 433 forming projector 431. Extrusion 432 has a disk shape, centered along the shaft 433 of projector 331. As projector 431 is accelerated in the +X direction (to the left in FIG. 4), extrusion portion 432 impacts ring stopper 430.

Contact portion 434 transmits the impact force of projector 431 from ring stopper 430 to cylindrical shell 455. Thus, the impact force generates acoustic waves in a dipole pattern from source 400. After impact, projector 431 returns to its original position, moving along the −X direction by the decompression of spring 440, similarly to embodiments shown in FIGS. 2, 3A, and 3B. Sleeves 445-1 and 445-2 separate projector 431 from coils 470-1 and 470-2, respectively. Sleeves 445-1 and 445-2 reduce the friction at the surface of magnets 460-1 and 460-2, as projector 431 moves along the X-axis. Embodiments consistent with the present disclosure de-couple coils 470-1 and 470-2 from ring stopper 430, to avoid acoustic transmission from ring stopper 430 through coils 470-1 and 470-2. Also shown in FIG. 4, cavity 480 provides acoustic isolation between both projector 431 and ring stopper 430 inside cylindrical shell 455, and the exterior of cylindrical shell 455.

Figure 5:
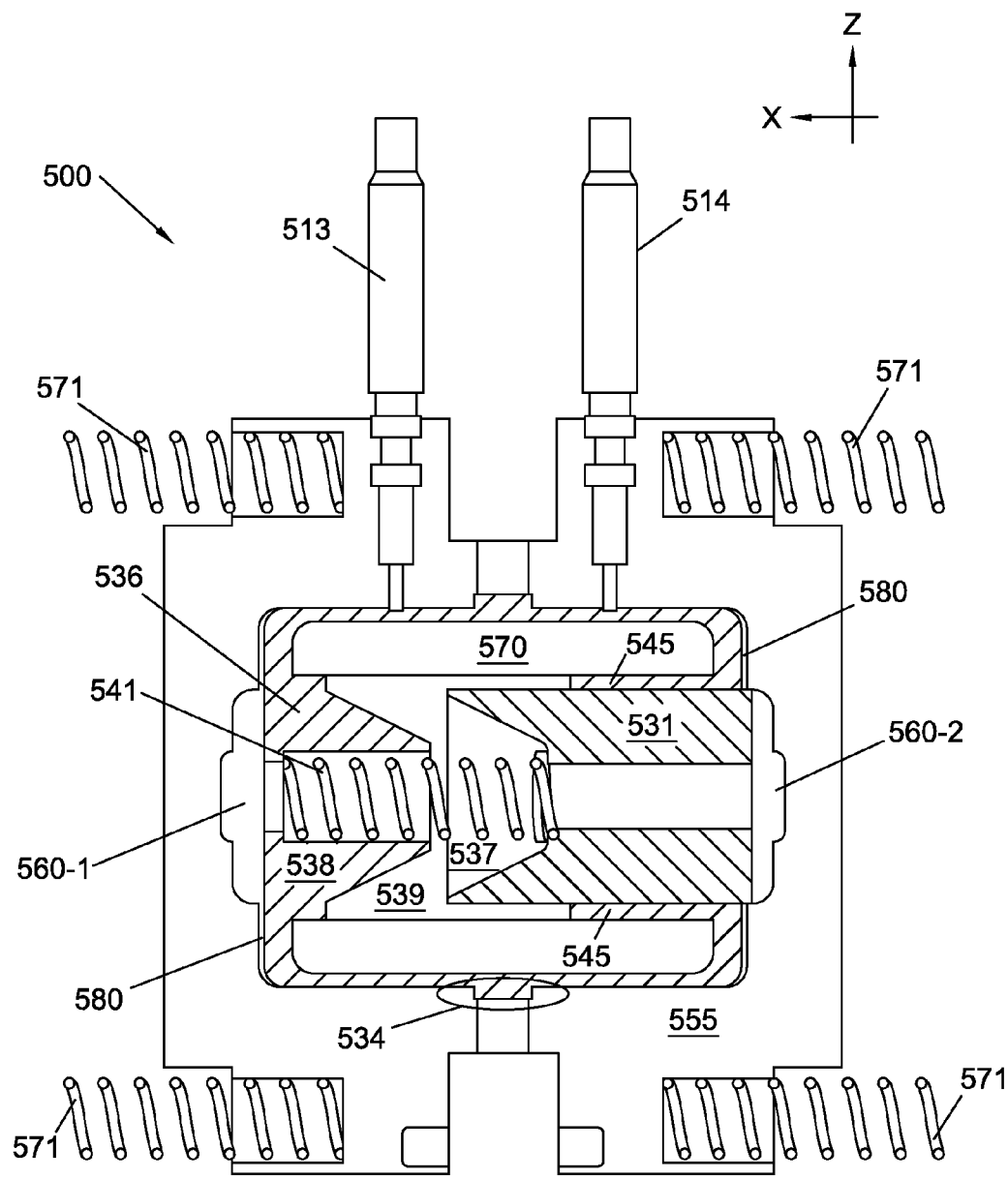
FIG. 5 illustrates a cross-sectional view of a wide bandwidth, borehole dipole source, according to some embodiments.

FIG. 5 illustrates a wide bandwidth, borehole dipole source 500 according to some embodiments. Dipole source 500 may include a current feed-through 513 and a current feed-through 514, as described in detail above with respect to FIGS. 3B and 4. According to embodiments consistent with the present disclosure, dipole source 500 includes a single coil 570 coupled to both current feed-through 513 and to current feed-through 514. A centerpiece 536 is separate from cylindrical shell 555 and fixed to shell 555 through contact portion 534. According to some embodiments, a projector 531 has a cylindrical shape, with a symmetry axis along the X-direction in FIG. 5. In some embodiments, projector 531 is made of a ferromagnetic material, such as ferrite. Thus, a current passing through coil 570 magnetizes projector 531. The magnetic field induced in projector 531 interacts with the magnetic field in coil 570, producing a force along the X-direction in FIG. 5. The force accelerates projector 531 in the +X-direction towards centerpiece 536. Projector 531 has a female indentation 537 that fits into a male extrusion 538 in centerpiece 536.

According to some embodiments, female indentation 537 in projector 531, and male extrusion 538 in centerpiece 536, have a frustoconical shape. The frustoconical shape formed by female indentation 537 in projector 531 and by male extrusion 538 in centerpiece 536 has a symmetry axis along the X-direction in FIG. 5. A space 539 forms between female indentation 537 of projector 531 and male extrusion 538 in centerpiece 536. In some embodiments, air or other fluid fills space 539. Elastomeric pads 560-1 and 560-2 dampen any vibration produced by contact with centerpiece 536 and with projector 531, de-coupling these vibrations from cylindrical shell 555. Thus, contact portion 534 transmits vibrations produced by the impact of projector 531 onto centerpiece 536 to cylindrical shell 555, in the middle part of dipole source 500. The symmetry of contact portion 534 forms a ring centered on the X-axis such that the acoustic wave produced by source 500 has a substantially dipolar pattern.

As projector 531 accelerates in the +X direction (to the left in FIG. 5), female portion 537 impacts male portion 538. Contact portion 534 transmits the impact force of projector 531 from centerpiece 536 to cylindrical shell 555. Thus, source 500 generates acoustic waves in a dipole pattern. After impact, projector 531 returns to its original position, moving along the −X-direction by the decompression of spring 541 similarly to embodiments shown in FIGS. 2, 3A, 3B, and 4. Projector 531 is separated from coil 570 by a sleeve 545 formed from centerpiece 536. Sleeve 545 in centerpiece 536 reduces friction at the surface of projector 531 and avoids contact between projector 531 and coil 570. Cavity 580 is disposed between centerpiece 536 and cylindrical shell 555. Cavity 580 provides acoustic isolation between both projector 531 and centerpiece 536 inside cylindrical shell 555, and the exterior of cylindrical shell 555. This is analogous to the acoustic isolation provided by cavities 280 and 380 (cf. FIGS. 2 and 3A, above).

FIG. 5 illustrates springs 571 holding dipole source 500 inside a logging tool, such as logging tool 10 (cf. FIG. 1). The outer ends of springs 571 attach the springs to logging tool 10. Springs 571 reduce the acoustic coupling between dipole source 500 and the logging tool. Springs 571 allow dipole source 500 to move along the X-direction, which is the direction of the impact force generated by dipole source 500. Springs 571 restrict the motion of projector 531 in a direction perpendicular to the impact force (along either the Z-axis, or the Y-axis). This configuration enhances the efficiency of acoustic generation of dipole source 500, eliminating inertial effects that deflect the impact force from the dipole direction along the X-axis. The precise value of the spring constant in springs 541 and 571 is not limiting, the value depends on the specific application. In some embodiments, springs 571 have a higher spring constant than restoring spring 541. For example, in some embodiments restoring spring 541 may have a spring constant of about 10 lb/in (pounds per inch), and springs 571 may have a spring constant of about 50 lb/in. It is desirable to have spring constants for springs 541 and spring 571 such that no spring is resonant with the acoustic waves generated by dipole source 500.

Embodiments of a dipole source such as disclosed herein produce acoustic waves in a bandwidth of interest from a lower limit at about 300 Hz to a higher limit at about 9 kHz. Dipole sources according to embodiments herein have materials and designs including mass and spring constants such that the dipole source structure has intrinsic natural frequencies outside the desired acoustic bandwidth. Thus, a low intrinsic frequency of the structure formed by the dipole source and a logging tool may be less than the lower limit desired for acoustic generation, e.g. less than about 300 Hz. The high intrinsic frequencies of the structure may be greater than the higher limit for acoustic generation, at about 9 kHz. With the natural frequencies of the structure out of the target frequency range, the output frequency spectrum is smooth and flat in the region of interest. Thus, in the acoustic range of interest (e.g. 300 Hz-9 kHz) no single frequency dominates the output.

Another consideration to include in embodiments consistent with the present disclosure is the material used in cylindrical shell 255, 355, 455, or 555. A light material may be desirable such that most of the energy produced by the impact of the projector on the cylindrical shell is transferred into kinetic energy of vibration. In addition, a material having high tensile strength may be desirable in order to provide efficient acoustic coupling in the higher end of the desired frequency band. Furthermore, embodiments consistent with the present disclosure may include a cylindrical shell made of a material having low magnetic permeability and susceptibility. Having a material with low magnetic susceptibility, the surrounding dipole source structure does not distort the magnetic field produced by coils inside the dipole generator. A material with a low magnetic susceptibility is 'transparent' to the magnetic field.

According to the above considerations, some embodiments may use a titanium alloy for a cylindrical shell consistent with the present disclosure. For example, materials for a cylindrical shell as used in some embodiments may have a density of less than about 5 grams per cubic centimeter (g/cc). In some embodiments, a material with a high tensile strength may have a tensile strength greater than 800 Mega-Pascals (MPa, 1 Mega Pascal=$10^6$ Pa). For example, some materials for a cylindrical shell as used in some embodiments may have a tensile strength of about 860 MPa, 930 MPa, or even higher than 1000 MPa. Furthermore, materials for a cylindrical shell as used in some embodiments may have a magnetic susceptibility of about $4 \times 10^{-6}$ cubic centimeters per gram (cc/g, in CGS, mass units), or less.

Figure 6:
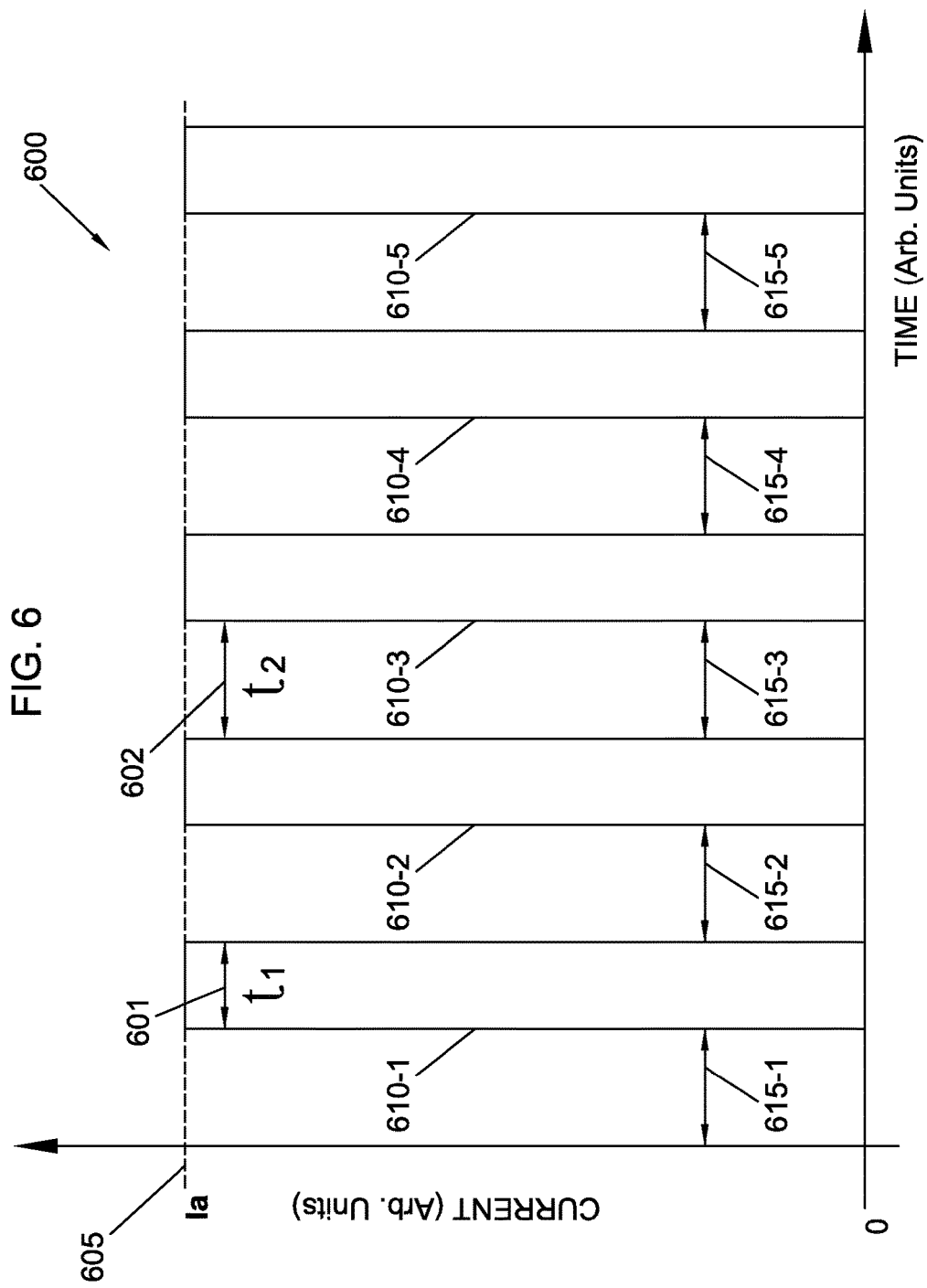
FIG. 6 illustrates a current waveform provided to a wide bandwidth, borehole dipole source, according to some embodiments.

Further according to some embodiments, a material desired for projector 531 (FIG. 5) may have high magnetic susceptibility and permeability. In some embodiments, a ferrite material having a relatively large density forms projector 531 (e.g. compared to the titanium alloy in cylindrical shell 355). According to some embodiments, a material used in projector 531 may have a magnetic susceptibility up to one thousand (1000) times greater than the magnetic susceptibility of the material used in the cylindrical shell. Further, according to some embodiments a material used in projector 531 may have a density of about eight (8) g/cc, or more. Increasing the projector mass in embodiments consistent with the present disclosure tends to increase the activation time of the device. FIG. 6 below depicts the activation time, as discussed in more detail below.

FIG. 6 illustrates a current waveform 600 provided to a wide bandwidth borehole dipole source, according to some embodiments. Waveform 600 is a time profile of current fed to conducting coils in a wide bandwidth dipole source, such as illustrated in any of FIG. 2, 3A, 3B, 4, or 5. However, for the purpose of illustration, the following description of FIG. refers to FIG. 2, such that dipole source 200 receives waveform 600, and current waveform 600 feeds coils 270-1 through 270-6. Waveform 600 includes coil activation periods 610 and coil de-activation periods 615. Activation periods 610 last for a time $\tau_1$ 601, and de-activation periods 615 last for a time $\tau_2$ 602. According to some embodiments, each activation period 610-1 through 610-5 may have the same profile and the same duration 601. Likewise, in some embodiments each de-activation period 615-1 through 615-5 may have the same duration 602. Further consistent with the present disclosure some activation periods 610-$i$, and 610-$j$ may have different time duration such that 601-$i$≠601-$j$ ($i$≠$j$). Also consistent with the present disclosure some de-activation periods 615-$i$, and 615-$j$ may have different time duration such that 602-$i$≠602-$j$ ($i$≠$j$).

Activation periods 610 include the injection of a current $I_a$ 605 to a conducting coil in a dipole source (cf. FIG. 6). According to some embodiments, period 610 in waveform 600 may include providing a constant current $I_a$ 605 to a conducting coil during time 601. In some embodiments, the current $I_a$ 605 provided to a dipole source in periods 610-$i$ and 610-$j$ may have different values 605-$i$≠605-$j$ ($i$≠$j$). According to embodiments consistent with the present disclosure, waveform 600 may be a square waveform. A square waveform such as illustrated in FIG. 6 may result in an impact force having a wide bandwidth, which is desirable in many applications of a dipole source such as 200, 300, 400, and 500 (cf. FIGS. 2, 3A, 4, and 5).

Consistent with at least some embodiments, the activation period may last for about 8 ms. In some embodiments, the activation period may last for about 3 ms. Other embodiments may have activation periods between about 3 ms and about 8 ms. Furthermore, activation periods longer than about 8 ms and shorter than about 3 ms are possible in embodiments consistent with the present disclosure. To enhance the impact force, some embodiments use a longer activation period relative to the previously mentioned range, creating a higher terminal velocity for the projector upon impact. The impact of the projector on the stopper determines the frequency bandwidth of the resulting acoustic wave. The frequency bandwidth of the resulting acoustic wave may include frequencies between about 300 Hz and about 9 kHz.

According to some embodiments, the current provided to the conductive coil during an activation period causes an acceleration of a projector such as projector 231 (cf. FIG. 2) to a velocity from about 10 m/s to about 20 m/s before impacting the center beam 210.

In some embodiments, the sign of current 605 provided by waveform 600 may alternate between positive and negative values. For example, in some embodiments using dipole source 200 a coil 270-$i$ may receive a positive current $I_a$ 605 to produce a positive magneto-motive force +Fx-i during a period 501-$m$. Coil 270-$i$ may also receive a negative current $I_a$ 605 to produce a negative magneto-motive force −Fx-i during a period 601-$n$ ($m$≠$n$). Likewise, in embodiments using dipole source 300 a coil 370-$i$ may receive a positive current $I_a$ 605 to produce a positive magneto-motive force +Fx-i during a period 601-$m$, and a negative current $I_a$ 605 to produce a negative magneto-motive force −Fx-i during a period 601-$n$ (m≠n).

Current $I_a$ 605 through coil 270-$i$ (dipole source 200) or coil 370-$i$ (dipole source 300) may produce a positive or negative horizontal force Fx on projector 231 (source 200) or 331 (source 300), depending on the sign of current $I_a$ 605. The specific sign of the force Fx for a given value of current $I_a$ 605 depends on the orientation of conductive coil 270-$i$ or 370-$i$ relative to the orientation of magnet 260-$i$ or 360-$i$, respectively. The specific orientation of coils and magnets in a dipole source used with waveform 600 is not limiting of the general concept depicted in FIG. 6. In some embodiments consistent with the present disclosure, activation period 610 may activate all the coils in a dipole source at the same time. For example, activation period 610 may activate conductive coils 270-1 through 270-6 in source 200, or coils 370-1 and 370-2 in source 300. By arranging the orientation of each of the coils relative to the magnet interacting with it, a positive or negative value of current $I_a$ 605 may result in all coil-magnet pairs generating a magneto-motive force Fx-i in the same direction.

In some embodiments, a selected group of coils may be activated during a period 610-$i$, and a different group of coils may be activated during a different period 610-$j$ (i≠j). For example, in some embodiments using dipole source 200 coils 270-1 through 270-3 may be activated during a period 610-$i$, and coils 270-4 through 270-6 may be activated during a period 610-$j$ (i≠j). Likewise, in embodiments using dipole source 300 coil 370-1 may be activated during a period 610-$i$, and coil 370-2 may be activated during a period 610-$j$ (i≠j).

Further according to some embodiments, only the coils located on one side of a projector, such as 231 or 331 (cf. FIGS. 2 and 3) may receive current $I_a$ 605 during activation intervals 610. For example, some embodiments activate only coils 270-1 through 270-3 during each period 610 (cf. FIG. 2). Likewise, in embodiments using source 300 (cf. FIG. 3A) only activate coil 370-1 during period 610.

The value of activation time interval 601 and de-activation time interval 602 may vary according to different applications of a dipole source using waveform 600. In some embodiments, time interval 602 may be selected to allow for a projector such as 231 (source 200) or 331 (source 300) to return to an equilibrium position before the next activation period 610 occurs. Some embodiments of waveform 600 include de-activation time 602 such that a shear wave S produced in substrate 50 may travel through substrate 50, parallel to borehole 15, and reach detector 35 in logging tool 10 before the next activation period 610 occurs (cf. FIG. 1).

According to some embodiments, de-activation period 602 may be comparable to a delay of an acoustic wave propagating along a borehole axis from the dipole source to a sensor.

Further, according to some embodiments the frequency of a shear acoustic wave generated is between about 500 Hz to about 6 kHz. In some embodiments, the impact of the projector on the stopper is such that the shear acoustic wave has a spectral bandwidth greater than about 6 kHz. For example, the frequency bandwidth may be from about 300 Hz up to about 9 kHz, according to some embodiments consistent with the present disclosure.

Figure 7:
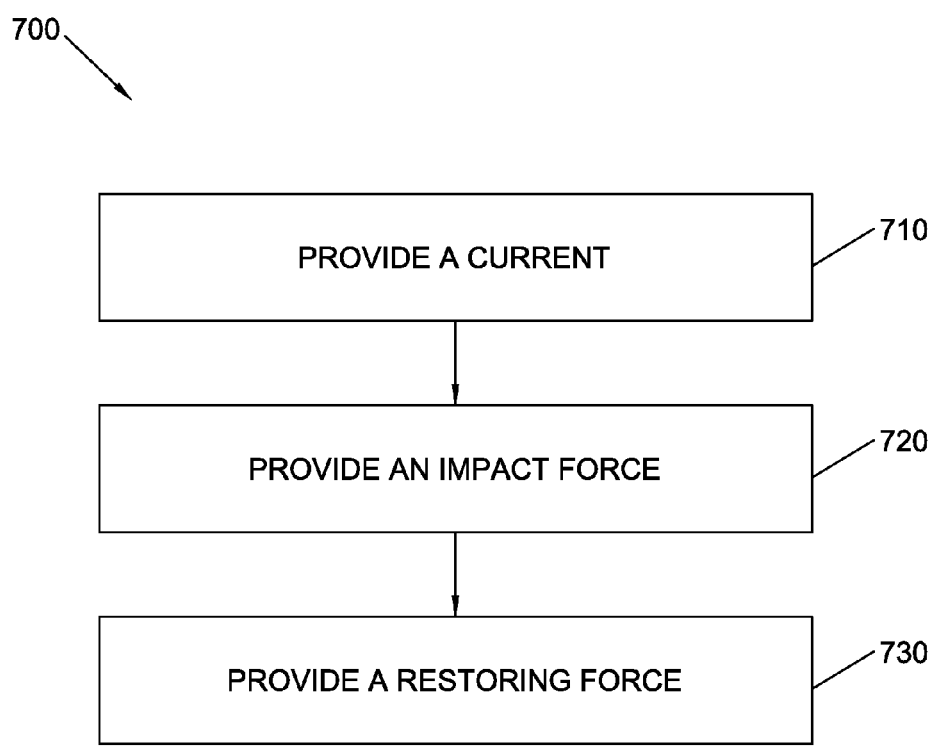
FIG. 7 shows a flowchart of a method for generating an acoustic wave using a wide bandwidth, borehole dipole source, according to some embodiments.

FIG. 7 shows a flowchart of a method 700 for generating an acoustic wave using a wide bandwidth, borehole dipole source, according to some embodiments. Method 700 may be used in connection with a dipole source as disclosed herein, such as dipole source 100 (cf. FIG. 1), dipole source 200 (cf. FIG. 2), dipole source 300 (cf. FIG. 3A), dipole source 400 (FIG. 4), and dipole source 500 (FIG. 5). For example, in some embodiments consistent with the present disclosure, controller 20 may include instructions stored in memory 22 that, when executed by processor 21 cause a wide bandwidth, borehole dipole source to execute method 700. Controller 20 may provide commands, instructions, and power to dipole source 100 through connector 25. Dipole source 100 may be included within logging tool 10, as depicted in FIG. 1. Further, according to some embodiments, controller 20 may perform method 700 at the command of a user. In some embodiments, logging tool 10 may provide instructions and commands for executing method 700 with a wide bandwidth, borehole dipole source. Some embodiments consistent with the present disclosure may perform method 700 by a combination of commands and instructions from a user, controller 20, and logging tool 10, as depicted in FIG. 1.

Step 710 provides a current for a selected time interval. According to some embodiments, a waveform such as waveform 600 representing a value of current as a function of time (cf. FIG. 6) may provide the current in step 710. The waveform in step 710 may have activation periods 610 for a time $\tau_1$ 601, and de-activation periods 615 for a time $\tau_2$ 602. In some embodiments, step 710 provides the current during activation periods 610 of waveform 600. According to some embodiments, step 710 may include providing a current to a conductive coil included in the dipole source during the selected time interval. In some embodiments, step 710 in method 700 provides a current to one or more conducting coils such as coils 270-1 through 270-6 (cf. FIG. 2), or coils 370-1 and 370-2 (cf. FIG. 3A). Step 720 uses the current provided in step 710 to provide an impact force in the dipole source during the selected time interval. According to some embodiments, step 720 provides a magneto-motive force propelling a projector against a center beam during activation period 610 for a time $\tau_1$ 601 (cf. FIG. 6). Some embodiments of method 700 use a dipole source including the projector and the center beam such as projector 231 and center beam 210 (cf. FIG. 2).

Providing an impact force to a dipole source in step 720 generates a dipole acoustic wave. Thus, step 720 may include generating an acoustic wave having a spatial pattern substantially symmetric about an axis of the dipole source, namely the dipole axis. The acoustic wave travels preferentially in a direction perpendicular to the Z-axis in the logging tool configuration and impinges on the substrate surrounding a borehole, such as substrate 50 and borehole 15 (cf. point $P_o$ in FIG. 1). According to embodiments consistent with the present disclosure, step 720 provides an impact force including a force $\vec{F}$ and a time derivative $\partial \vec{F}/\partial t$ applied substantially along a common direction. Consistent with embodiments disclosed herein, the common direction of the force $\vec{F}$ and its time derivative $\partial \vec{F}/\partial t$, is substantially parallel to the dipole axis.

Step 730 provides a restoring force to the projector for a selected time interval. According to some embodiments, 730 may provide the restoring force during de-activation period 615 for a time $\tau_2$ 602 in waveform 600 (cf. FIG. 6). In some embodiments, step 730 provides a restoring force to projector 231 by springs 240-1 through 240-4 (cf. FIG. 2). In some embodiments, step 730 provides the restoring force to projector 331 by springs 340-1 and 340-2 (cf. FIG. 3A).

Figure 8:
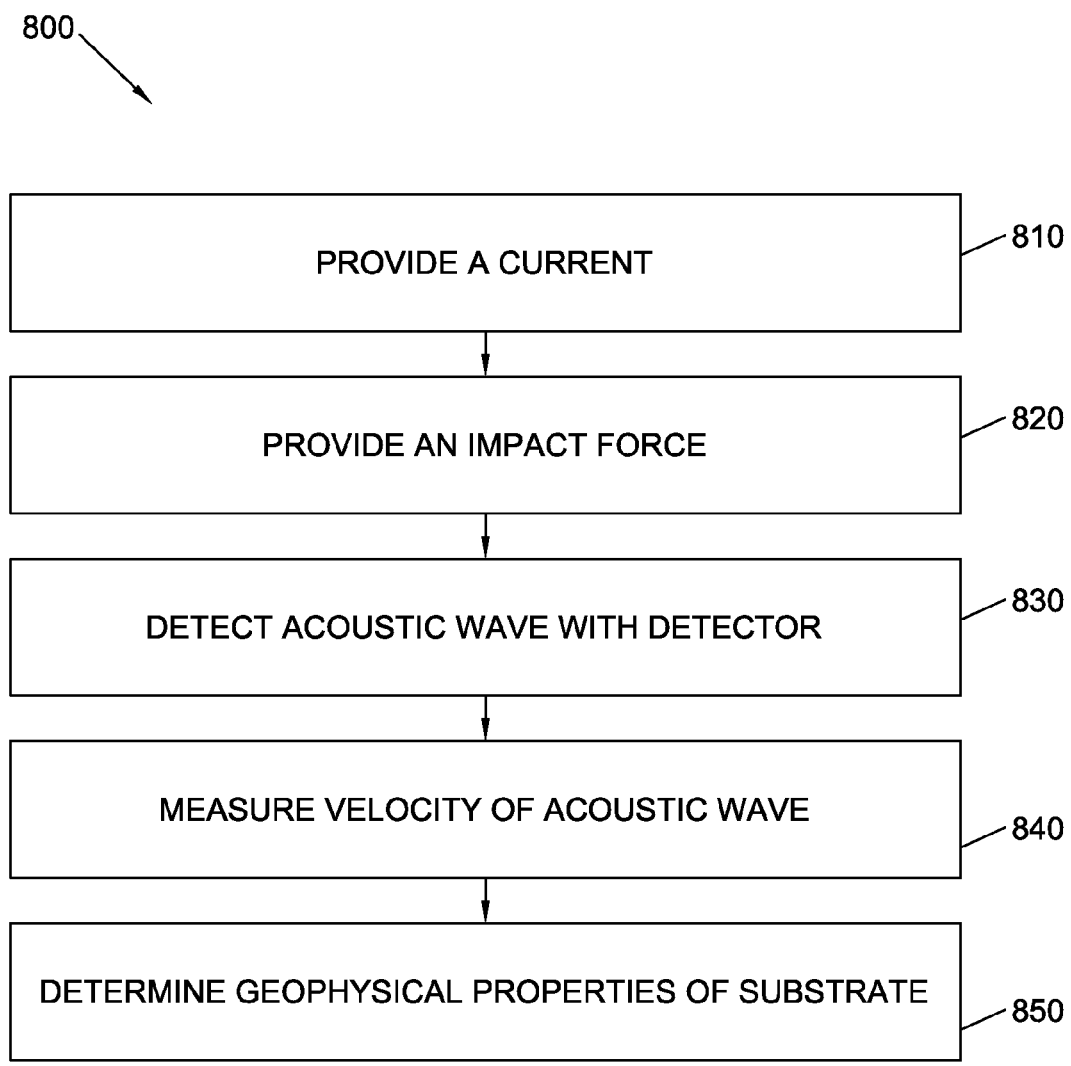
FIG. 8 shows a flowchart of a method for measuring properties of a substrate using an acoustic logging tool having a wide bandwidth, borehole dipole source and an acoustic detector, according to some embodiments.

In some embodiments a logging tool including a dipole source as disclosed herein and an acoustic detector may perform method 700 for measuring properties of a substrate. FIG. 8 describes such method in detail, as follows.

FIG. 8 shows a flowchart of a method 800 for measuring properties of a substrate using an acoustic logging tool having a wide bandwidth, borehole dipole source and an acoustic detector, according to some embodiments. Method 800 may be used in connection with a dipole source as disclosed herein, such as dipole source 100 (cf. FIG. 1), dipole source 200 (cf. FIG. 2), dipole source 300 (cf. FIG. 3A), dipole source 400 (cf. FIG. 4), and dipole source 500 (cf. FIG. 5). For example, in some embodiments consistent with the present disclosure, controller 20 may include instructions stored in memory 22 that, when executed by processor 21 cause processor 21 to perform method 800. Controller 20 may provide commands, instructions, and power to dipole source 100 through connector 25. Dipole source 100 may be included within logging tool 10, as depicted in FIG. 1. Further, according to some embodiments, controller 20 may perform method 800 upon receiving commands from a user. In some embodiments, logging tool 10 provides instructions and commands for executing method 800 with a dipole source as disclosed herein. Some embodiments consistent with the present disclosure may perform method 800 by a combination of commands and instructions from a user, controller 20, and logging tool 10, as depicted in FIG. 1.

Step 810 provides a current for a selected time interval. In some embodiments consistent with the present disclosure, step 810 may be as step 710 in method 700 described above (cf. FIG. 7). Step 820 uses the current in step 810 to provide an impact force to the dipole source. According to some embodiments, step 820 in method 800 may be as described in detail above in relation to step 720, in method 700. Step 830 detects an acoustic wave. According to some embodiments, an acoustic detector included in a logging tool such as logging tool 10 (cf. FIG. 1) detects an acoustic wave in step 830. The acoustic detector used in step 830 may be at a certain distance along the Z-axis, in logging tool 10. In some embodiments, acoustic detector 35 may be placed above, below, or both above and below the dipole source 100 in logging tool 10.

In embodiments consistent with the present disclosure, an acoustic wave detected in step 830 may be a shear wave S propagating through substrate 50 along the Z-direction (cf. FIG. 1). Shear wave S may be produced in substrate 50 at a point $P_o$ by the acoustic dipole perturbation produced by dipole source 100 according to step 820 above. Step 840 measures the velocity of acoustic wave S through the substrate. In some embodiments, step 840 measures the velocity using the time at which step 820 generates the dipole perturbation and the time at which step 830 detects wave S. Furthermore, step 840 may be performed using knowledge of the distance between dipole source 100 and acoustic detector 35, along logging tool 10 (Z-axis, cf. FIG. 1).

A velocity measurement in step 840 may further include measurements performed for a plurality of acoustic waves S having different frequencies. Thus, in embodiments of method 800 consistent with the present disclosure step 840 obtains a dispersion pattern. A dispersion pattern obtained in step 840 may include different acoustic frequencies and the corresponding velocity measurement for each acoustic frequency. The use of a wide bandwidth dipole source such as source 100 (cf. FIG. 1), 200 (cf. FIG. 2), or 300 (cf. FIG. 3A) enables the collection of detailed dispersion patterns in 840, due to the high frequency content of the impulsive forces produced by such dipole sources.

Step 850 determines geophysical properties of substrate 50 using the propagation properties of acoustic wave S as measured in step 840. For example, in embodiments consistent with the present disclosure step 850 uses the speed measured in step 840 to determine whether the wave S has traversed through a substrate such as sand gap 51 or porous rock 52. According to some embodiments, processor circuit 21 in controller 20 (cf. FIG. 1) performs step 850. For example, a computer in controller 20 may compare velocity measurements in step 840 with a previously collected database, stored in memory circuit 22. In some embodiments, method 800 includes the use of a database having a plurality of dispersion patterns in step 850. Each dispersion pattern stored in the database relates to a specific earth formation of known acoustic properties. Thus, step 850 selects an earth formation that more closely approximates the dispersion pattern obtained in step 840.

Throughout the specification, elements that are 'coupled' may be directly connected or indirectly connected to each other.

Embodiments described herein are exemplary only. One skilled in the art may recognize various alternative embodiments from those specifically disclosed. Those alternative embodiments are within the scope of this disclosure. As such, only by the following claims limit the embodiments disclosed herein.

What is claimed is:

1. A dipole source for borehole acoustic logging comprising:
    a cylindrical shell having an interior and an exterior;
    a center beam having a bushing therein;
    a frame coupling the center beam to the interior of the cylindrical shell, the frame being directly coupled to the center beam;
    a movable projector disposed inside the bushing to impact the center beam by moving back and forth along a direction perpendicular to an axis of the center beam;
    at least one spring directly coupling the projector to the center beam to restore the projector to an initial position; and
    a cavity surrounding the frame to acoustically insulate the interior of the cylindrical shell from the exterior of the cylindrical shell.

2. The dipole source of claim 1, wherein the center beam has a ring shape centered about an axis of motion of the movable projector.

3. The dipole source of claim 1, wherein the movable projector impacts the center beam in a direction perpendicular to an axis of the cylindrical shell.

4. The dipole source of claim 3, wherein the axis of the cylindrical shell is parallel to a longitudinal axis of a borehole.

5. The dipole source of claim 1, further comprising a magnet and a conductive coil, the magnet disposed to receive a magneto-motive force from the conductive coil that propels the projector to impact on the center beam.

6. The dipole source of claim 5, wherein the conductive coil is directly coupled to the cylindrical shell and the magnet is directly coupled to the movable projector.

7. The dipole source of claim 5, wherein the conductive coil is coupled to the center beam and the magnet is enclosed in the movable projector.

8. The dipole source of claim 1, wherein the movable projector comprises a first portion and a second portion coupled by a shaft, the first portion configured to impact a first side of the center beam and the second portion configured to impact a second side of the center beam.

9. The dipole source of claim 1, wherein the movable projector comprises a stopper to contact the center beam upon impact.

10. The dipole source of claim 9, wherein the stopper is formed of a material having elastic properties selected to increase a frequency bandwidth of an acoustic wave generated by the impact of the projector with the center beam.

11. The dipole source of claim 1, wherein the moveable projector is disposed inside the cylindrical shell to generate an acoustic wave having a dipole modal distribution when the movable projector impacts the center beam.

12. The dipole source of claim 11, wherein the acoustic wave propagates as a shear acoustic wave in a direction perpendicular to a symmetry axis of the dipole modal distribution through a substrate surrounding the dipole source.

13. The dipole source of claim 1, wherein a width of the cylindrical shell is less than about four inches.

14. The dipole source of claim 1, further comprising a conductive coil, wherein:
the center beam is separated from the cylindrical shell, the center beam contacting the cylindrical shell through a contact portion of the cylindrical shell along a direction of motion of the movable projector; and
the conductive coil is coupled to a power source to receive a current to provide a magneto-motive force that causes the movable projector to impact the center beam.

15. The dipole source of claim 14 wherein a first magnetic susceptibility of a material that forms the moveable projector is about one thousand times greater than a second magnetic susceptibility of a material that forms the cylindrical shell.

16. An acoustic logging tool for making measurements of a substrate surrounding a borehole comprising:
a body insertable in the borehole, the body comprising an acoustic detector and a dipole source each disposed along an axial length of the body, the dipole source comprising:
a cylindrical shell;
a center beam having a bushing therein;
a frame coupling the center beam to the cylindrical shell, the frame being directly coupled to the center beam;
a movable projector disposed inside the bushing to impact the center beam in a direction along a dipole axis of the dipole source, the dipole axis being perpendicular to an axis of the center beam;
a plurality of springs directly coupling the projector to the center beam to restore the projector to an initial position after impacting the center beam; and
a cavity surrounding the frame to acoustically insulate an interior of the cylindrical shell from an exterior of the cylindrical shell; and
a control unit operatively coupled to the acoustic detector and the dipole source to provide power thereto and to process data collected from the acoustic detector to obtain information about the substrate surrounding the borehole.

17. The acoustic logging tool of claim 16 wherein the dipole axis is perpendicular to a longitudinal direction along the borehole.

18. The acoustic logging tool of claim 16 wherein the dipole source further comprises a magnet directly coupled to the projector and a conductive coil directly coupled to the cylindrical shell, the magnet receiving a magneto-motive force from the conductive coil to propel the projector to impact the center beam.

19. A method for generating an acoustic wave in a spatial pattern having a dipole symmetry axis comprising:
providing a current to a coil for a first selected time interval;
propelling a projector through a bushing of a center beam to thereby impact the center beam using a magneto-motive force generated by the current during the first selected time interval, the impact of the projector with the center beam comprising a force and a change in time of the force, wherein:
a direction of the force and a direction of the change in time of the force are substantially the same, along a dipole symmetry axis; and
providing a restoring force to the projector for a second selected time interval, wherein:
the projector, the coil, and the center beam are disposed inside a frame coupling the center beam to an interior of a cylindrical shell, the frame being directly coupled to the center beam;
at least one spring directly coupling the projector to the center beam to restore the projector to an initial position; and
a cavity surrounding the frame and filled by a fluid which acoustically insulates the interior of the cylindrical shell from an exterior of the cylindrical shell.

20. The method of claim 19 further wherein providing the restoring force to the projector in the dipole source during the second selected time interval comprises using a plurality of springs coupling the projector to the center beam.

21. The method of claim 19 wherein the magneto-motive force is generated by an interaction of the coil directly coupled to the cylindrical shell and a magnet directly coupled to the projector.

22. A method for measuring properties of a substrate using an acoustic logging tool having a dipole source, the method comprising:
using the dipole source, generating an acoustic wave in a pattern substantially symmetric about an axis of the dipole source, the dipole source being positioned in a borehole;
detecting the acoustic wave using an acoustic detector placed along an axial length of the acoustic logging tool, the acoustic detector being positioned in the borehole; and
measuring a velocity of the acoustic wave through the substrate, wherein generating an acoustic wave in a pattern substantially symmetric about an axis of the dipole source comprises:
providing a current to a coil for a first selected time interval;
propelling a projector through a bushing of a center beam to thereby impact the center beam using a magneto-motive force generated by the current during the first selected time interval, the impact of the projector with the center beam comprising a force and a change in time of the force, wherein a direction of the force and a direction of the change in time of the force are substantially the same; and
providing a restoring force to the projector for a second selected time interval, along a dipole symmetry axis, wherein:
the projector, the coil, and the center beam are disposed inside a frame coupling the center beam to an interior of a cylindrical shell, the frame being directly coupled to the center beam; and a cavity surrounding the frame and filled by a fluid which acoustically insulates the interior of the cylindrical shell from an exterior of the cylindrical shell, wherein providing the restoring force to the projector for the second selected time interval comprises using a plurality of springs directly coupling the projector to the center beam.

23. The method of claim 22 wherein the magneto-motive force is generated by an interaction of the coil directly coupled to the cylindrical shell and a magnet directly coupled to the projector.

24. The method of claim 22 wherein generating an acoustic wave in a pattern substantially symmetric about an axis of the dipole source comprises generating acoustic waves within a frequency bandwidth comprising frequencies between 300 Hz and 9 kHz.

\* \* \* \* \*